United States Patent Office 3,076,001
Patented Jan. 29, 1963

3,076,001
PROCESS FOR PREPARING 16β-METHYLPREDNISONE
Giangiacomo Nathansohn, Milan, Italy, and Emilio Testa, Vacallo, Ticino, Switzerland, assignors to Lepetit S.p.A., Milan, Italy
No Drawing. Filed Jan. 29, 1962, Ser. No. 169,651
4 Claims. (Cl. 260—397.45)

This invention relates to an improved process for preparing 16β-methylprednisone acetate or 16β-methylpregna-1,4-diene-17α,21-diol-3,11,20-trione 21-acetate.

16β-methylprednisone is a known steroid, the pharmacological activity of which is described in Annals of New York Academy of Sciences, 82, 829 (1959).

The first processes for the preparation of 16β-methylprednisone were described in J. Am. Chem. Society, 80, 4428 and 4435 (1958), and 82, 4012 (1960). These processes, however, are based on chemical reactions starting from expensive raw materials and operating with low yields. The high cost of the final product thus obtained has till now limited its practical therapeutical use.

Particularly, 5β-pregn-16-en-3α-ol-11,20-dione-3 - acetate has been described as a starting compound. It was prepared starting from 5β-pregnane-3α,17α,21-triol-11,20-dione-3,21-diacetate, a steroid which already contains the 17α-hydroxy and 21-acetoxy groups. These groups however must be first removed to prepare 5β-pregn-16-en-3α-ol-11,20-dione-3α-acetate, in which the same groups must be subsequently reintroduced to build up the structure of 16β-methylprednisone.

5β-pregnane-3α,17α,21-triol-11,20-dione-3,21 - diacetate is obtained in turn from bile acids, the side chain of which can be degraded only through several expensive steps and with low yields.

A much more convenient synthetic route to 16β-methylprednisone has been described by us in Experientia, 17, 448 (1961), and forms the subject of our copending application Serial No. 169,111, filed January 26, 1962. By this procedure, 16-methyl-5α-pregn-16-en-3β-ol-11,20-dione 3β-acetate is advantageously used as the starting product. It can be easily obtained in good yields from steroids of plant origin as described, for instance, in Farmaco, 16, 58 (1961).

The process consists in converting said 16-methyl-5α-pregn-16-en-3β-ol-11,20-dione 3β-acetate into its 16α,17α-epoxide by treatment with hydrogen peroxide in an alcoholic aqueous alkaline solution at room temperature for 15–20 hours; the resulting epoxide is heated with p-toluene-sulphonic acid in an inert solvent, for example, benzene, at the boiling temperature of the solvent for 2–3 hours to obtain 16-methylene-5α-pregnane-3β,17α-diol-11,20-dione.

This last compound is converted, by mild reduction with hydrogen, using palladium adsorbed on an earth alkali metal carbonate as a catalyst, in an inert organic solvent, to 16β-methyl-5α-pregnane-3β,17α-diol-11,20-dione, which is practically free from 16α-isomer.

The 16β-methyl-5α-pregnane-3β,17α-diol-11,20-dione is converted into 16β-methyl-5α-pregnane-3β,17α,21-triol-11,20-dione 21-acetate by treatment with bromine in an inert organic solvent at room temperature, evaporation of the solvent to dryness and refluxing the crude 21-bromo-derivative for 15–18 hours with potassium acetate in aqueous acetone.

By oxidation of the thereby obtained 16β-methyl-5α-pregnane-3β,17α,21-triol-11,20-dione 21-acetate with a sulphuric acid solution of chromic acid in acetone 16β-methyl-5α-pregnane-17α,21-diol-3,11,20-trione-21 - acetate is obtained. This latter, through the 2,4-dibromo derivative obtained by treatment with bromine in acetic acid, gives the final product by dehydrobromination with a mixture of lithium bromide and lithium carbonate in dimethylformamide.

The final product, i.e. 16β-methylprednisone-21-acetate, can be hydrolysed in known manner to obtain 16β-methylprednisone.

It has been now found that one of the intermediate compounds of this process, i.e. 16β-methyl-5α-pregnane-17α,21-diol-3,11,20-trione 21-acetate can be converted into 16β-methylprednisone 21-acetate by a still more convenient procedure, which is briefly described hereinafter and which forms the subject of the present application.

According to this invention, to 16β-methyl-5α-pregnane-17α,21-diol-3,11,20-trione 21-acetate (I) dissolved in an inert anhydrous organic solvent, a solution of one molecular equivalent of bromine dissolved in the same solvent is added at a temperature not exceeding 20° C. By pouring the mass into ice water preferably buffered with sodium acetate, 2-bromo-16β-methyl-5α-pregnane-17α,21-diol - 3,11,20-trione 21-acetate (II) precipitates and is collected. The compound II is refluxed with about 2 molecular equivalents of both lithium bromide and lithium carbonate in dimethylformamide in the absence of air and then the mass is poured into ice water previously made strongly acidic by the addition of hydrochloric acid. The precipitated product is 16β-methyl-pregn-1-ene-17α,21-diol-3,11,20-trione 21-acetate (III).

The mono-ene III is finally refluxed with selenium dioxide in a 1:10 mixture of acetic acid and, an inert organic solvent at a temperature between about 80° and 90° C. Although many organic solvents proved satisfactory to this purpose, such as dioxane and many lower aliphatic alcohols, we prefer to employ tertiary butanol, which always gave excellent results. After removing the solvent in vacuo, the residue is dissolved in ethyl acetate and the solution washed with sodium bicarbonate solution to neutral reaction, then with an ammonium sulfide and a sodium chloride solution in water and evaporated to dryness. The residue is recrystallized from aqueous acetone giving 16β-methylprednisone 21-acetate in a highly pure state.

The reaction scheme is as follows:

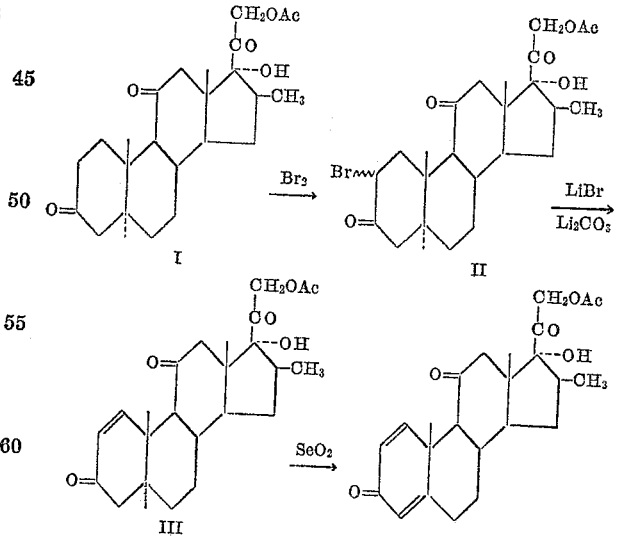

When compared with the process of our copending application Serial No. 169,111, the present process shows the advantage that the overall yield is fairly improved. Instead of the previously obtained yield of about 55–58%, a 65–68% is obtained. This improvement has to be considered as a valuable advance, due to the nature of the end product, i.e. of a steroid of high commercial value and high cost.

The following example is illustrative of the invention.

Example

To a solution of 40 g. of 16β-methyl-5α-pregnane-17α,21-diol-3,11,20-trione 21-acetate in 900 ml. of dioxane a solution of 15.6 g. of bromine in 156 ml. of dioxane is quickly added, taking care that the temperature does not exceed 20° C. The mixture is then poured into 10 litres of water containing 2 kg. of ice and 20 g. of sodium acetate. The precipitate is collected and dried. Yield 45.2 g. (95%) of 2-bromo-16β-methyl-5α-pregnane-17α,21-diol-3,11,20-trione 21-acetate, M.P. 135–139° C., $[\alpha]_D +119°$ (dioxane) or $+111.6°$ (chloroform).

A mixture of 34.6 g. of the above bromo derivative, 370 ml. of dimethylformamide, 13.28 g. of lithium carbonate and 13.28 g. of lithium bromide is refluxed under a nitrogen atmosphere for about 1.5 hours. About 200 ml. of dimethylformamide are then removed by distillation and the residue is poured into 10 litres of water containing 2 kg. of ice and 80 ml. of conc. hydrochloric acid. The precipitate is collected and thoroughly washed with water. Yield 27.6 g. (95%) of 16β-methylpregn-1-ene-17α,21-diol-3,11,20-trione 21-acetate, M.P. 225–230° C., $[\alpha]_D +167°$ (c. 0.5, dioxane).

A mixture of 39 g. of the abovemono-ene, 1950 ml. of ter-butanol, 19.5 ml. of acetic acid and 11.7 g. of selenium dioxide is refluxed for about 10 hours under a nitrogen atmosphere, then a further quantity of 11.7 g. of selenium dioxide is added and refluxing is continued for about 20 hours. After cooling the mixture is filtered and evaporated to dryness. The residue is taken up with 2 litres of ethyl acetate and washed with an aqueous solution of sodium bicarbonate then with a water solution of ammonium sulfide and finally with a saturated water solution of sodium chloride. The ethyl acetate layer is evaporated to dryness and the residue is dissolved in hot acetone. After addition of water and cooling 16β-methylprednisone 21-acetate precipitates and is collected and dried. Yield 29.5 g. (76%), M.P. 218–220° C., $[\alpha]_D +207.1°$ (c. 0.5, CHCl$_3$).

The overall yield starting from 16β-methyl-5α-pregnane-17α,21-diol-3,11,20-trione 21-acetate is thus about 68%.

We claim:

1. A process for preparing 16β-methylprednisone 21-acetate, which comprises bringing together 16β-methyl-5α-pregnane-17α,21-diol 21-acetate and bromine in a molecular ratio of about 1:1 at a temperature not exceeding 20° C. in an inert organic solvent, refluxing the obtained 2 - bromo - 16β - methyl - 5α - pregnane - 17α,21 - diol-3,11,20-trione 21-acetate with about two molecular equivalents of lithium bromide and lithium carbonate in dimethylformamide, and refluxing the obtained 16β-methylpregn-1-ene-17α,21-diol 21-acetate with selenium dioxide in an about 1:10 mixture of acetic acid and an inert organic solvent miscible with acetic acid.

2. A process as in claim 1, wherein the inert organic solvent miscible with acetic acid is a lower aliphatic alcohol.

3. A process as in claim 2, wherein the lower aliphatic alcohol is ter-butanol.

4. In a process for preparing 16β-methylprednisone 21-acetate, the steps which comprise bringing together 16β-methyl-5α-pregnane-17α,21-diol 21-acetate and bromine in a molecular ratio of about 1:1 at a temperature not exceeding 20° C. in dioxane, refluxing the obtained 2 - bromo - 16β - methyl - 5α - pregnane - 17α,21 - diol-3,11,20-trione 21-acetate with about two molecular equivalents of lithium bromide and lithium carbonate in dimethylformamide, and refluxing the obtained 16β-methylpregn-1-ene-17α,21-diol 21-acetate with selenium dioxide in an about 1:10 mixture of acetic acid and ter-butanol.

References Cited in the file of this patent

UNITED STATES PATENTS

| 3,007,947 | Counsell | Nov. 7, 1961 |
| 3,018,296 | Klimstra | Jan. 23, 1962 |

OTHER REFERENCES

Szpilfogel et al.: Rec. trav. chim., vol. 75, pp. 475–480, May 1956.

UNITED STATES PATENT OFFICE
CERTIFICATE OF CORRECTION

Patent No. 3,076,001 January 29, 1963

Giangiacomo Nathansohn et al.

It is hereby certified that error appears in the above numbered patent requiring correction and that the said Letters Patent should read as corrected below.

Column 4, lines 5, 12, 22 and 29, after "-17α,21-diol", each occurrence, insert -- 3,11,20-trione --.

Signed and sealed this 19th day of November 1963.

(SEAL)
Attest:
ERNEST W. SWIDER
Attesting Officer

EDWIN L. REYNOLDS
Acting Commissioner of Patents